(12) United States Patent
Ekin

(10) Patent No.: US 9,791,766 B2
(45) Date of Patent: *Oct. 17, 2017

(54) PORTABLE LICENSE PLATE READER, SPEED SENSOR AND FACE RECOGNITION SYSTEM

(71) Applicant: EKIN TEKNOLOJI SANAYI VE TICARET ANONIM SIRKETI, Istanbul (TR)

(72) Inventor: Akif Ekin, Istanbul (TR)

(73) Assignee: EKIN TEKNOLOJI SANAYI VE TICARET ANONIM SIRKETI, Istanbul (TR)

( * ) Notice: Subject to any disclaimer, the term of this patent is extended or adjusted under 35 U.S.C. 154(b) by 38 days.

This patent is subject to a terminal disclaimer.

(21) Appl. No.: 14/981,964

(22) Filed: Dec. 29, 2015

(65) Prior Publication Data

US 2016/0132743 A1    May 12, 2016

Related U.S. Application Data

(63) Continuation-in-part of application No. 14/777,522, filed as application No. PCT/TR2013/000365 on Dec. 20, 2013.

(51) Int. Cl.
| | |
|---|---|
| G06K 9/00 | (2006.01) |
| G03B 17/02 | (2006.01) |
| G08G 1/017 | (2006.01) |
| G08G 1/054 | (2006.01) |
| G03B 29/00 | (2006.01) |
| B60Q 1/26 | (2006.01) |

(52) U.S. Cl.
CPC .......... *G03B 17/02* (2013.01); *G08G 1/0175* (2013.01); *G08G 1/054* (2013.01); *B60Q 1/2611* (2013.01); *G03B 29/00* (2013.01); *G03B 2215/0567* (2013.01); *G03B 2217/002* (2013.01)

(58) Field of Classification Search
None
See application file for complete search history.

(56) References Cited

U.S. PATENT DOCUMENTS

2013/0066542 A1\*    3/2013    Chung ............... G08G 1/04
                                                                    701/119

\* cited by examiner

*Primary Examiner* — Delomia L Gilliard
(74) *Attorney, Agent, or Firm* — Gokalp Bayramoglu

(57) ABSTRACT

The invention provides a portable apparatus for reading a license plate, sensing speed and recognizing a face, which comprises a camera placed on the front right and front left and both sides of the system which enables the system to capture images and recognize faces, LED lighting located around the cameras which are directed towards a visual direction and which enable capturing of legible images even at night time, police lights placed at the front and rear faces of the base which can flash on and off when necessary, an alarm control device, Ethernet connection forming the network, cooling device which eliminates the heat formed inside the apparatus, a control card which operates the police lights, modem which continuously provide wireless communication and a top cover which encloses the entire system.

3 Claims, 8 Drawing Sheets

PORTABLE LICENSE PLATE READER, SPEED SENSOR AND FACE RECOGNITION SYSTEM

TECHNICAL FIELD

The invention is related to overcoming frequently faced problems during the usage of license plate reader (image processing), speed sensor (radar) and face recognition devices.

The invention is particularly related to a license plate reader that is to be mounted on mobile vehicles such as police cars for security or surveillance purposes and ambulances which have right of way, to a speed sensing apparatus which determines the speed of all vehicles that are mobile and/or immobile in traffic by developing a portable apparatus that is formed by combining the speed sensor and face recognition device; to reading of license plates, enquiring registration of said license plates, enquiring information of drivers and pedestrians, giving warnings and notifying the related units if necessary. All functions can be carried out by the invention even when the vehicle is on the move.

BACKGROUND OF THE INVENTION

Vehicles are defined by license plates which act as a kind of identification card nowadays. The license plates are aimed to define each vehicle by distinguishing said vehicles from each other by means of the authentic structure of the license plates. Traffic registration records, vehicle taxes, highway fees, etc are all evaluated in accordance with and are recorded in relation to, these license plate numbers.

When it is taken into account that vehicles are objects that are always on the move, it is important to carry out the necessary procedures by determining the license plate numbers correctly. This determination procedure which was carried out by people, using classic methods, until recently led to delays and more importantly led to many mistakes. Apart from this, many people had to be employed due to the large numbers of vehicles and extensive living envioronments (highways, roads, etc.)

Automatic camera systems have been developed in order to overcome the disadvantages mentioned above regarding the reading of license plates. The European Patent titles "Automatic License Plate Recognition System Integrated with an Electronic Toll Fee Collection System" describes a device which charges the fees for highways etc to vehicles and records said fees to the license plate of vehicles on the move. In order to reach this aim, both the front and the rear photos of the vehicles are taken via cameras, and the license plate numbers are determined by means of special software.

The license plate recognition systems that are more extensively used nowadays also operate according to the same logic. One of the characteristics of the license plate recognition systems that are mounted fixedly to especially certain entrance and exit points of the city is that said systems continuously takes photos of the vehicles that come into sight and notifies the related posts when necessary.

The systems mentioned above do carry out the license plate reading function but they also bring along disadvantages. Said disadvantages are that these cameras are positioned fixedly as they need high source of energy and a software with an algorithm that can read plates when the vehicle is mobile. Besides, said systems have a low rate of success as they can only read plates in a limited zone.

The European Patent titled "Automatic License Plate Reader System" describes a portable system formed of a personal computer and a camera in order to overcome the disadvantages mentioned above. Although said system is portable it also has many disadvantages as it has to be operated by a person.

In the present technique the license plate recognition/reader system operate as being integrated with speed sensing devices. This way, both controls in traffic is provided and those who are driving faster than the legal speed limits can be determined. However, said systems can only be positioned to a fixed spot due to the reasons mentioned above. Moreover none of these system which do not provide mobile solution comprise a face recognition system.

As a result, it has been seen as an obligation to develop the related state of art due to the inadequacy of the present solutions and the requirement for a system having a license plate reader, speed sensor and face recognition apparatus, which can be mounted on vehicles that are on the move in traffic such as security vehicles and/or which can read all of the license plates of all vehicles that have been parked, which can sense the speed of vehicles, perform face recognition, which can remotely perform enquiry through its own database and other databases, which can send a visual and audio warning to the related post and the user in the case that the license plate of the vehicles that are searched for are determined.

SUMMARY OF THE INVENTION

The aim of the invention is to have different technical characteristics which can provide a new development in this field different to the embodiments used in the present technique.

The principal aim of the portable license plate reader and the speed sensor and face recognition apparatus which can perform simultaneously in all lanes, enables to provide traffic supervision and order for security forces such as traffic police, in their vehicles when they are on the move.

Said portable plate reader, speed sensor and face recognition apparatus; forms a compact and integrated apparatus comprising a license plate reader system, a speed sensor device, a face recognition system and a server connected thereto, a warning system and flashers of security vehicles.

Another aim of the invention is to run the information obtained during license plate reading and face recognition procedures in its own database or enquire said information in other databases, and to notify the automatic enquiry results to the user.

Another aim of the invention is to enable the automatic detection of the speed of vehicles and to automatically read the license plate of vehicles that are on the move and are parked/immobile, wherein said system is mounted onto vehicles that are mobile.

Another aim of the invention is for the system to enquire the information obtained during automatic plate reading and face recognition procedures in its own database and other related databases and notifying said enquiry results to the user automatically.

Another aim of the invention is for the system to be able to send automatic audio and visual warnings to the related posts and to the users in the case that the license plates of the vehicles are determined during enquiry.

Another aim of the invention is for the system to be able to send automatic audio and visual warnings to the related posts and to the users in the case that the faces of people are recognized during enquiry.

Another aim of the invention is for the system to automatically recognize the persons that are being searched for and to automatically apply by scanning up to a 180 degree angle of the face recognition system with the MFR (Mobile Face Recognition) defined as the face recognition system when the object is mobile or at a fixed position under fixed conditions or where the relative speed is maximum 100 km/h.

Another aim of the invention is for the system to be able to be mounted in the same way as the present beacon lamp is mounted without damaging the vehicle and without carrying out any kind of change on the vehicle that it is to be mounted on, during the mounting onto said vehicle by means of its plug & play feature.

Another aim of the invention is to be able to convert any kind brand or model vehicle, due to its plug and play feature, and said system shall be suitable to be used not only in patrol cars but at the same time in vehicles that have right of way such as ambulances.

Another aim of the invention is to be able to use the system as it has a compact structure, in vehicles without causing area restriction and visual pollution, and without said system consuming extra space inside the vehicle, whereby said system can be mounted without carrying out any kind of change on the infrastructure used, in order to mount a beacon onto the vehicle by means of its plug and play structure.

Another aim of the invention is to provide a one and only system which performs automatic license plate determination and automatic speed determination for all five lanes including the two lanes on the left, two lanes on the right and the lane that the smart vehicle is travelling in, (including the vehicles moving in the same direction and in the opposite direction) when the smart vehicle is on the move, and to keep a record of violation and to share this record with the headquarters.

Another aim of the invention is to provide a system which is one and only in the world which enables to read the license plates in five lanes at the same time. The apparatus does not require travels to be carried out in the middle lane, but it can carry out license plate reading in five lanes including the vehicles that are travelling from the opposite lane.

Another aim of the invention is to provide a one and only system, which is located between the fixed license plate reading station and mobile smart devices or between two or more than two mobile smart device vehicles utilizing the same system, wherein said system can calculate the average speed of any of the vehicles that are on the move.

Another aim of the invention is to adjust synchronization between a plurality of smart systems, to ensure the simultaneous and coordinated flashing on and off of for example red-blue warning lights by connecting them virtually to each other, in smart vehicles travelling consecutively on the same road, utilizing said system, and to provide safety in connection therewith.

Another aim of the invention is to provide communication between a plurality of smart systems which continuously shares the position information of vehicles, and all other vehicle information (license plate, images, speed) with each other, thereby notifying the enquiry information to the user in order to ensure that the necessary actions are taken as soon as possible.

Another aim of the invention is to read the license plates of smart vehicles which are on the move or vehicles that are parked, in order to determine if the vehicles have been parked by mistake/incorrectly or in places where parking is illegal and to carry out the necessary penal actions.

Another aim of the invention is to be able to record in a single centre the information recorded by all image capturing and audio recording devices by operating as a mobile data collection and data transfer centre and is to enable easy access to information.

Another aim of the invention is to be able to add any kind of sensors on said invention which acts as a mobile data collection and data transfer centre, and to be able to provide transfer of said records and analysis received from said sensors to the recording centre.

REFERENCES OF THE PARTS

Figure 1:
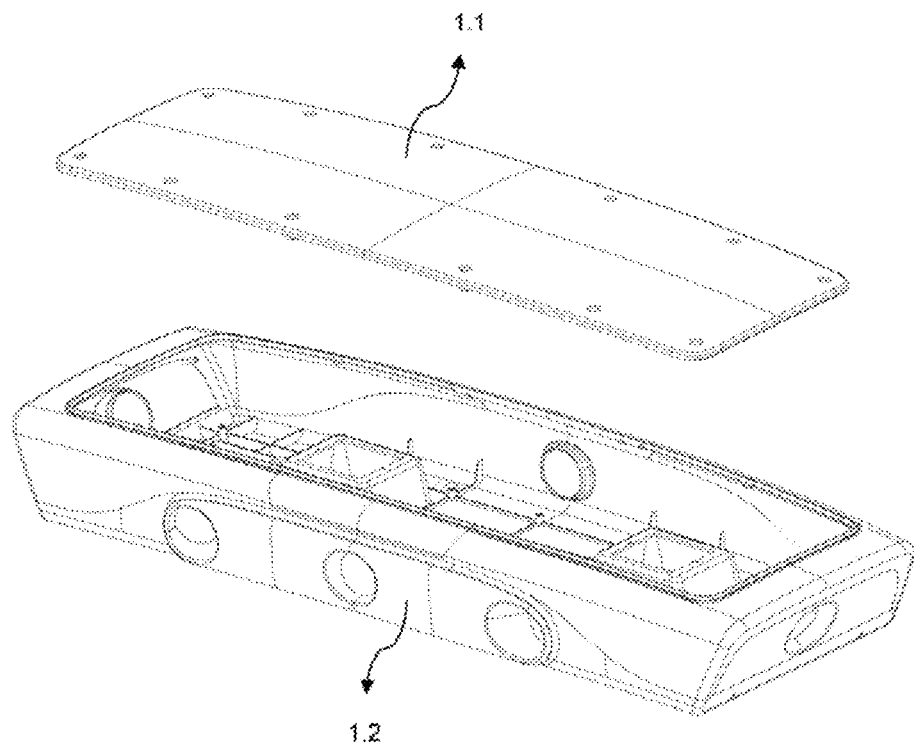
FIG. 1: Is the top cover view of the portable plate reader, speed sensor and face recognition apparatus subject to the invention
Figure 2:
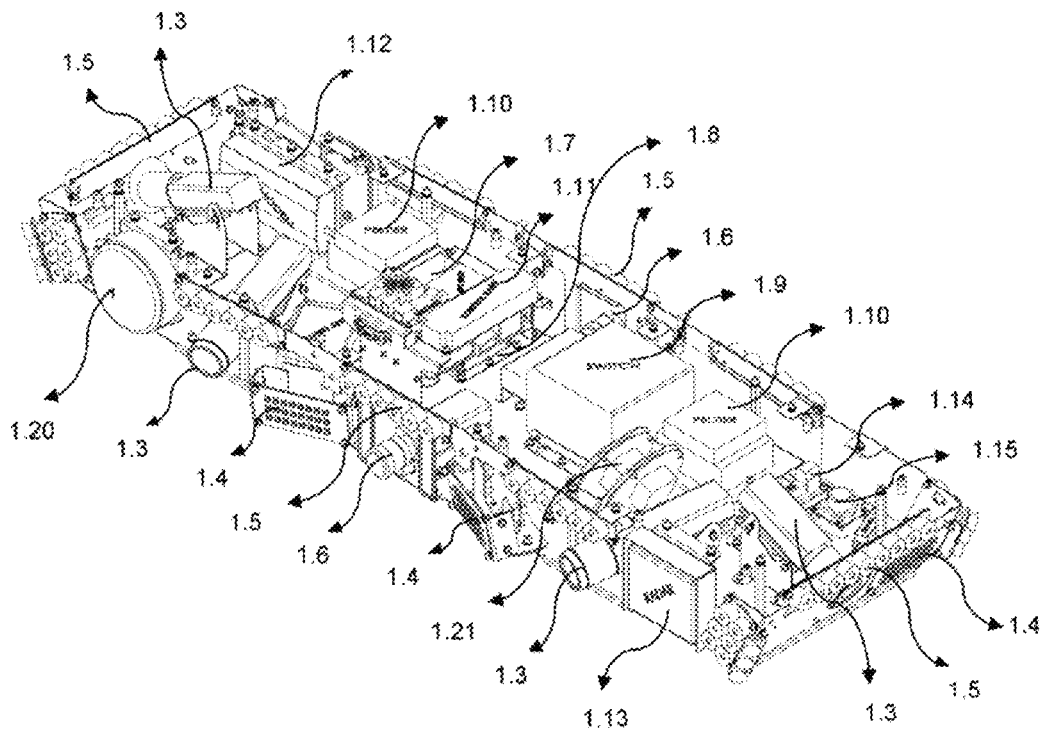
FIG. 2: Is the placement of the internal hardware of the portable license plate reader, speed sensor and face recognition apparatus subject to the invention
Figure 3:
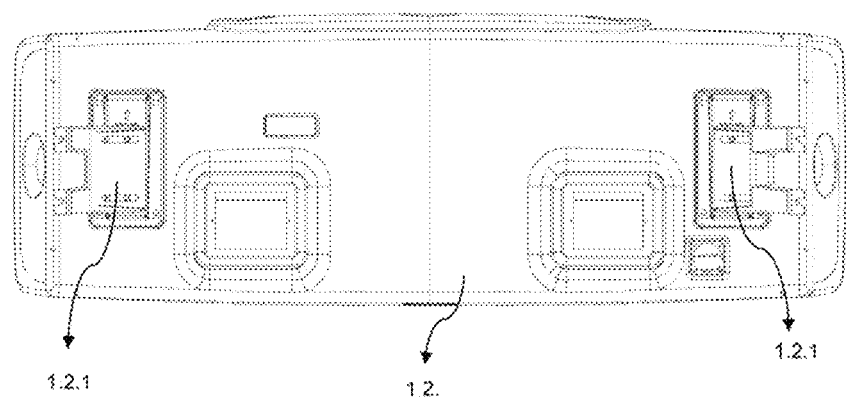
FIG. 3: Is the bottom view of the license plate reader, speed sensor and face recognition apparatus subject to the invention.
Figure 4:
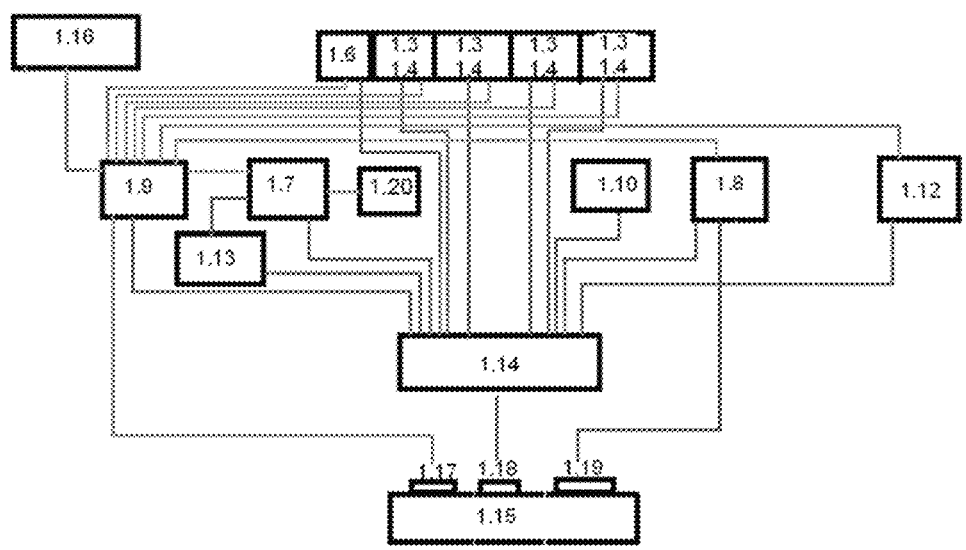
FIG. 4: Is the connection scheme of the license plate reader, speed sensor and face recognition apparatus subject to the invention
Figure 5:
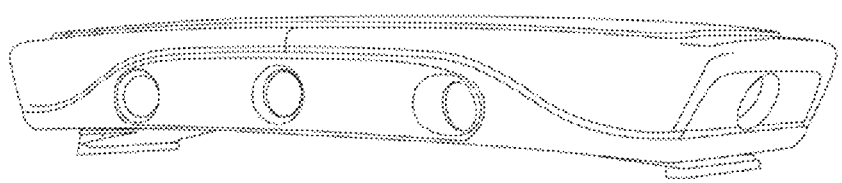
FIG. 5: Is the plug and play compact integrated structure of the invention
Figure 6:
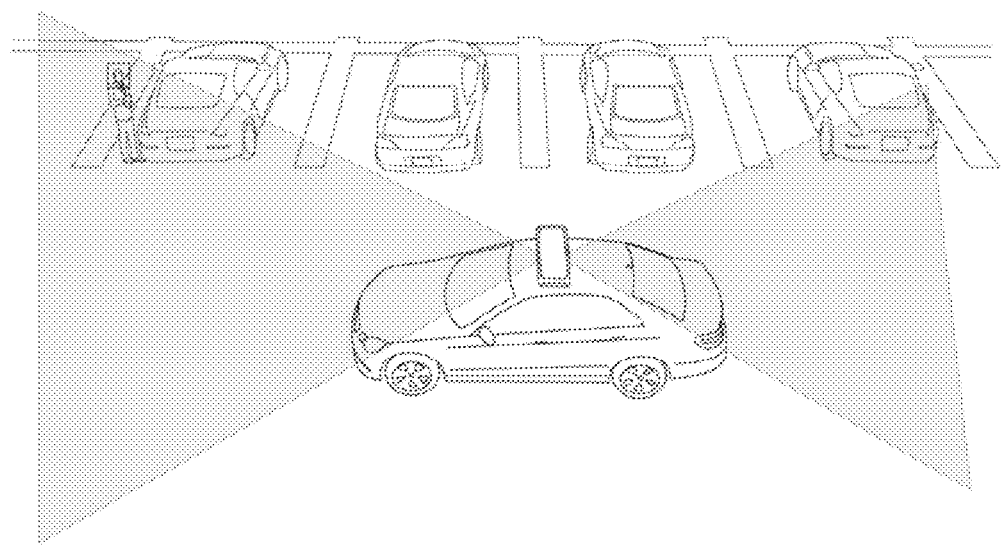
FIG. 6: Is the view where the face recognition function is carried out by the invention at a mobile state
Figure 7:
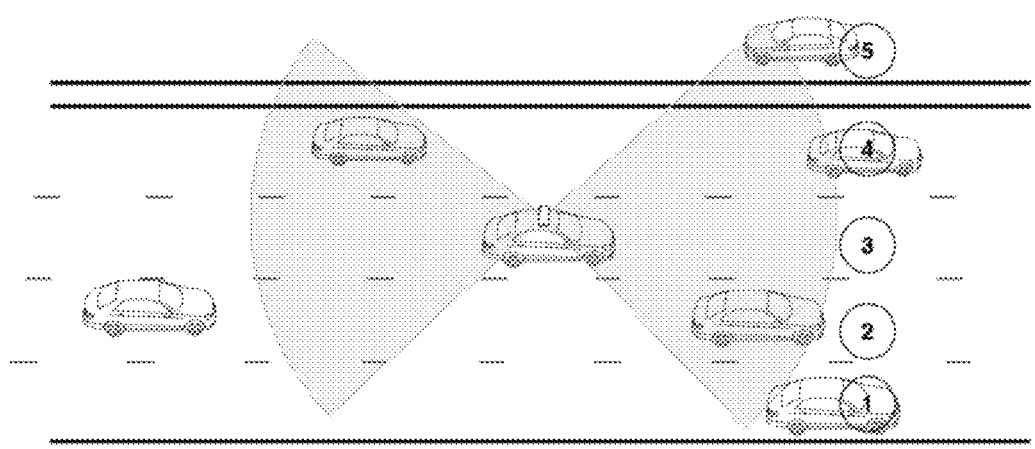
FIG. 7: Is the view of the invention which can carry out license plate reading in a total of five lanes, including the opposite lanes when a single and only vehicle is on the move.
Figure 8:
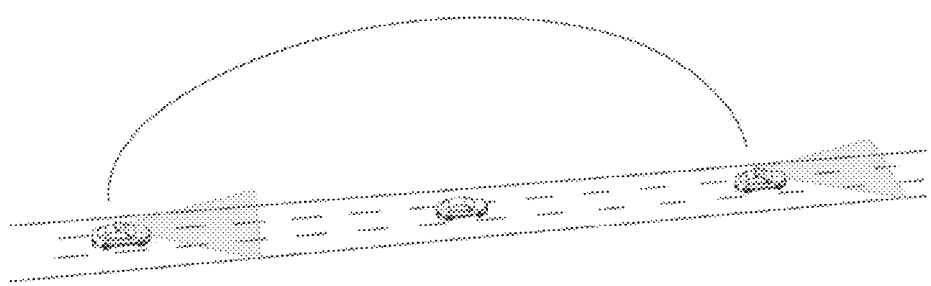
FIG. 8: Is the view of the invention which can provide the average speed information between the fixed license plate reading station and a vehicle on the move or between a single and only or two or more smart vehicles on the move.
Figure 9:
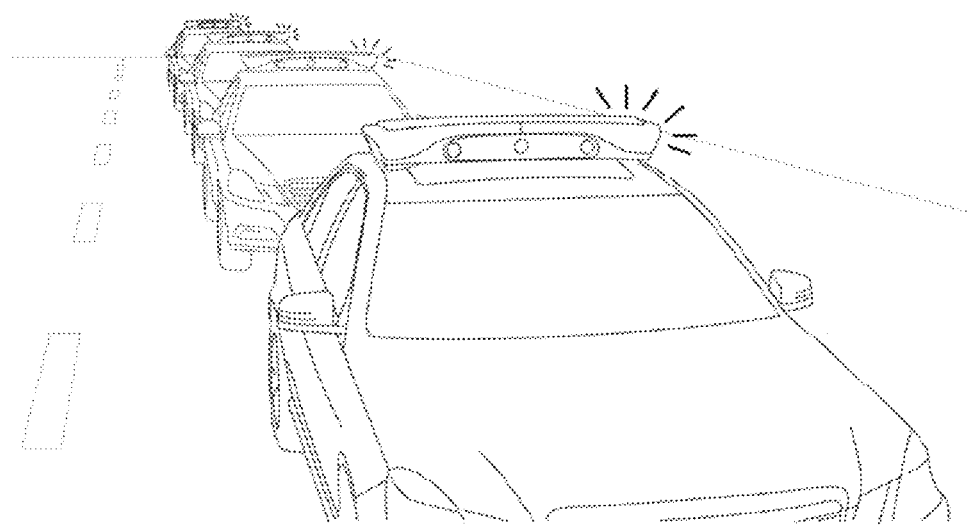
FIG. 9: Is the view of the virtual synchronized operability of a plurality of smart vehicles with each other when they are on the move or at a fixed position according, to the invention.

1 Apparatus
1.1 Top cover
1.2 Base
   1.2.1 Mounting apparatus
1.3 Camera
1.4 Led lighting
1.5 Police Lights
1.6 General view camera
1.7 Recording device
1.8 Alarm control device
1.9 Ethernet connection
1.10 Codling device
1.11 Control card
1.12 modem
1.13 Radar
1.14 Terminal
1.15 Connector
1.16 Client
1.17 Network
1.18 Feeder 12 VDC
1.19 Alarm
1.20 GPS
1.21 Wireless transfer device

DETAILED DESCRIPTION OF THE INVENTION

The invention is a portable license plate reader, speed sensor and face recognition apparatus (1) which can be mounted on mobile vehicles for security purposes, such as police cars and other mobile vehicles which have right of way such as ambulances; characterized in that said license plate reader, speed sensor and face recognition apparatus (1) comprises an apparatus (1.2.1) which enable coupling to the vehicle, a base (1.2) forming the structural frame of the apparatus onto which the mounting apparatus (1.2.1) is positioned, camera (1.3) mounted on the front right and front left and both sides of the base (1.2) which enable recording by the apparatus and face recognition functions, LED lighting (1.4) located around the cameras (1.3) which are directed towards visual direction and which enable capturing of legible images even at night time, a general view camera (1.6) positioned behind the base (1.2), which can carry out image resolution within itself, which can encode the data that can be used by the central software into the database, and which can control via a protocol that is compliant with the software, police lights (1.5) placed at the front and rear faces of the base (1.2) which can flash on and off when necessary, recording device (1.7) positioned on the base (1.2) which stores the obtained data and images, having a server, an alarm control device (1.8) which manages the alarm (1.19), Ethernet connection (1.9) forming the network, a cooling device (1.10) which eliminates the heat formed inside the apparatus, as control card (1. 1) which operates the police lights, modem (1.12) which continuously provides wireless communication and a top cover (1.1) which encloses the whole apparatus and a GPS module (1.20) from which all the positions of and violation information of all license plates are obtained.

Said portable license plate reader, speed sensor and face recognition system (1) operates with a 12VDC (1.18) voltage. By this means it is sufficient to use a portable source, and there is no obligation for the system to be placed in a fixed position. In the speed sensor system (1) an additional client (1.16) and network (1.17) system is used.

Said portable license plate reader, speed sensor and face recognition system (1) is able to simultaneously and automatically capture and read the license plates, to determine the speeds and to perform face recognition function for all vehicles that are in front of the vehicle utilizing the system, by means of the cameras (1.3) mounted thereon.

Said portable license plate reader, speed sensor and face recognition system (1) can minimize energy consumption by means of the LED lights (1.4) and can capture images and read license plates even during night time.

Said portable automatic license plate reader, speed sensor and face recognition system (1) can also determine the speed of the vehicle.

The recording device (1.7) comprise local files and a database server. The related data is transferred to these local servers and to the main server via 3G/4G/LTE or similar modem (1.12) or wireless connection The software of the recording device (17) is configured with an algorithm which can determine the speed of vehicles and process the images that have been captured when the system is mobile.

The portable license plate reader, speed sensor and face recognition system (1), can operate when the vehicle is on the more or when the vehicle is at a fixed position. The cameras (1.3) are in continuous recording state during operation and the file recorded in the recording device (1.7) is submitted to the server.

The image that is transferred to the server is processed by means of the special software located inside the server and the license plates are read and the information is submitted to the database (SQL) server. As the photograph of the vehicle taken simultaneously when the license plate image is being captured can be counted as evidence if necessary, the file of said images are submitted to the server. The speed information is obtained via RS-485 connection from the 3-dimension radar (1.13) that has been synchronized when the license plate of the vehicle is being read and this information is transferred to and saved in the database. The software located in the server, allocates the speed limit information of the region by using the GPS (Global Positioning, System) located on the modem (1.12) and when a speed that is over the speed limit is sensed, the speed violation of the vehicle whose license has been captured is recorded into the database. The license plate of all of the vehicles that have been read are recorded together with the GPS information thereof and as a result when an enquiry is being made, information on the locations that the vehicle has passed through can be obtained.

The face recognition module of the portable license plate reader, speed sensor and face recognition system (1), can operate when the relative speed is maximum 100 km/h and when the vehicle is on the move or when it is at a fixed position. The cameras (1.3) are on constant record during their operation and they provide images to the file server located in the record device (1.7). The images of the faces are processed by means of the special software located on the server and the license plates recorded therein are read and saved into the database (SQL) server. An automatic alarm is formed when the necessary enquire is carried out.

The portable license plate reader, speed sensor and face recognition system (1) can transmit power, network and can provide alarm connection via the connector (1.15) with the vehicle. The power is distributed to the components within the system by means of a terminal (1.14). the user can track the information it has obtained from the system, through the data processing device transiently by means of a network connection. Penalty fines or reporting can be carried out automatically and the user can report the incident if necessary and can carry out tracking and enquiries and can fine a penalty. The cameras (1.3) are operated constantly for security reasons and the user can have access to the records via a data processing device.

The modem (1.12), constantly transmits location information, the entire vehicle information (license plates, images, speed) and face recognition information to the recording centre. The vehicle is monitored at this centre and security of said vehicle is provided and quick intervention is enabled, and license plates can be enquired (in order to capture, illegal or stolen vehicles, or vehicles that are being searched) and face recognition procedures can be carried out.

The alarm control device (1.8) can control the system by means of the DI and DO sensors, The alarm can be triggered automatically or manually via a user command if necessary.

The invention claimed is:
1. A portable apparatus for reading license plate, sensing speed, and recognizing face, comprising:
   a mounting apparatus which is capable of coupling the portable apparatus to a vehicle;
   a base forming a structural frame of the portable apparatus onto which a mounting apparatus is positioned;
   a plurality of cameras mounted on a front right and a front left and both sides of the base for capturing images;

a plurality of LED lights located around the cameras which are directed in a visual direction and which enables capturing of legible images even at night time;

a general view camera positioned behind the base, which is capable of carrying out image resolution within itself;

a plurality of police lights placed at a front and rear faces of the base which are capable of flashing on and off;

a recording device positioned on the base which stores a plurality of obtained data and images, Wherein the recording device comprises a database server and software, the software of the recording device is configured with an algorithm which can determine the speed of vehicles and process the images that have been captured when the system is mobile;

a face recognition system configured to automatically recognize the persons that are being searched for and to automatically apply by scanning up to a 180 degree angle of the face recognition system with the Mobile Face Recognition (MFR);

an alarm control device;

an Ethernet connection forming the network;

a cooling device which eliminates the heat formed inside the portable apparatus;

a control card which operates the police lights;

a modem (1.12) which continuously provide wireless communication;

a top cover which encloses and seals of the portable apparatus.

2. The portable apparatus according to claim 1, which further comprises a radar which is capable of obtaining a speed information and recording said information to the database server.

3. The portable apparatus according to claim 1, which further comprises a terminal which is capable of distributing power to the portable apparatus.

* * * * *